(12) United States Patent
Hattori

(10) Patent No.: US 9,513,847 B2
(45) Date of Patent: Dec. 6, 2016

(54) TOOLS FOR FACILITATING PRINTER INSTALLATION

(71) Applicant: Tomoki Hattori, Suwanee, GA (US)

(72) Inventor: Tomoki Hattori, Suwanee, GA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/195,011

(22) Filed: Mar. 3, 2014

(65) Prior Publication Data

US 2015/0248263 A1 Sep. 3, 2015

(51) Int. Cl.
G06F 15/00 (2006.01)
G06F 3/12 (2006.01)
G06F 9/445 (2006.01)
G06F 9/44 (2006.01)

(52) U.S. Cl.
CPC .......... *G06F 3/1204* (2013.01); *G06F 3/1225* (2013.01); *G06F 3/1285* (2013.01); *G06F 8/61* (2013.01); *G06F 9/4411* (2013.01)

(58) Field of Classification Search
None
See application file for complete search history.

(56) References Cited

U.S. PATENT DOCUMENTS

| | | | |
|---|---|---|---|
| 7,793,285 B2 | 9/2010 | Hattori et al. | |
| 8,185,887 B2 | 5/2012 | Hattori | |
| 8,261,259 B2 | 9/2012 | Hattori | |
| 2003/0200289 A1* | 10/2003 | Kemp et al. | 709/221 |
| 2006/0122848 A1* | 6/2006 | Takagi | 705/1 |
| 2006/0170946 A1* | 8/2006 | Kawamura | 358/1.13 |
| 2007/0233834 A1 | 10/2007 | Hattori et al. | |
| 2007/0240156 A1* | 10/2007 | Nakata | 717/178 |
| 2008/0235241 A1 | 9/2008 | Hattori et al. | |
| 2009/0059272 A1 | 3/2009 | Matsushita et al. | |
| 2011/0261391 A1 | 10/2011 | Oba et al. | |
| 2012/0044534 A1* | 2/2012 | Ichikawa et al. | 358/1.15 |
| 2012/0162687 A1* | 6/2012 | Hattori | 358/1.13 |
| 2013/0014100 A1* | 1/2013 | Akiyama | 717/176 |
| 2013/0132950 A1* | 5/2013 | McLeod et al. | 718/1 |
| 2013/0141747 A1 | 6/2013 | Oba et al. | |
| 2014/0082602 A1* | 3/2014 | Mallur et al. | 717/171 |
| 2014/0366016 A1* | 12/2014 | Wang | G06F 8/61 717/178 |

OTHER PUBLICATIONS

U.S. Appl. No. 13/779,687, Tomoki Hattori, Feb. 27, 2013.
U.S. Appl. No. 14/018,689, Tomoki Hattori, Sep. 5, 2013.
U.S. Appl. No. 14/034,013, Tomoki Hattori, Sep. 23, 2013.
U.S. Appl. No. 14/187,552, Tomoki Hattori, Feb. 24, 2014.
"Print Management Step-by-Step Guide", Microsoft, Apr. 19, 2010.
"Ricoh Web Based Driver Installer", Ricoh.

* cited by examiner

*Primary Examiner* — Helen Q Zong
(74) *Attorney, Agent, or Firm* — Cooper & Dunham LLP

(57) ABSTRACT

Tools (such as systems, apparatuses, methodologies, executable computer program, etc.) are provided to facilitate installation of a device drivers on a user terminal by user selection of a target peripheral device, without any other required action by the user and without administrative login by the user on the user terminal.

20 Claims, 17 Drawing Sheets

Fig. 8D

```
void main ()
{
    package = get(InstallerPackage);

If package = printer driver
        Install(InstallerPackage);
        Port = CreatePort ();
        Address = get(PrinterHostAddress);
        InstallPortMonitor(Port, Address);

else
        output error message;

```
void main ()
{
    Package = get(InstallerPackage);

If Package = printer driver;
        Install(InstallerPackage);
        Port = CreatePort ();
        Address = get(PrinterHostAddress);
        InstallAgent(Address);

else
        output error message;

TOOLS FOR FACILITATING PRINTER INSTALLATION

TECHNICAL FIELD

This disclosure relates to tools (such as systems, apparatuses, methodologies, computer program products, etc.) for installing a printer, and more particularly, such tools that facilitate printer installation by a user.

BACKGROUND

In the current information age, there are often discussions of the desirableness of a paperless society. However, notwithstanding such discussions, there remains a great need by users of computers and other information terminals (that is, any of various devices from which a user may desire to submit a print job, such as personal computers, notebook computers, workstation computers, tablet computers, smartphones, PDAs, other information appliances, kiosks, etc.) for printing functionality. Thus, peripheral devices having printing or plotting functionality, such as printers, copiers, multi-function devices, etc., continue to play a significant role in information technology (IT) at home and at work.

Further, many users today carry one or more mobile terminals (such as notebook computers, tablet computers, smartphones, PDAs, etc.) with them and have an expectation of access to other IT provisions, while the user is on-the-go (e.g., away from home and office), even when the user is not familiar with, and/or in which the user is unaware of, the IT resources available to the user in that environment.

Typically, to print from a terminal to a printer, a device driver, specific to such printer, must be installed on the terminal. Such process typically needs to be performed through administrative login, which allows the logged-in user to perform various tasks, such as open a port on the terminal, find the host address of the printer and perform associations between the terminal and the printer. In a home environment, this requirement is typically not a large burden, since there is usually no more than one printer, or occasionally two printing devices, and the person installing such printer in, or permitting other devices access to, the home network performs such tasks only a limited number of times.

However, in an enterprise environment, or another network environment in which there are dozens (if not hundreds or thousands) of devices, a system or network administrator is typically required, to control access by the multitude of devices to various resources on the network. In such circumstances, the ordinary user is often (by policy) not permitted to arbitrarily install programs on the user's terminal which might open a gateway for unauthorized entry into the network environment. Thus, installation of software, such as device drivers, is usually required to be performed by an administrator. On the other hand, the administrator of such an IT environment which contains numerous printers and other peripheral devices may find that much time is spent installing drivers for the peripheral devices, and in a case that there is a large number of users in the IT environment, such burden becomes even more pronounced.

In some environments, the print system is configured for the terminal to submit the print job to a print server and not directly to a printer, and the print server, in lieu of the terminal, is configured via the appropriate print driver to communicate with the printer. In this case, the user terminal merely needs to be configured to submit print jobs to the print server and is not required to have device drivers installed thereon for each printer to which print jobs may be submitted. However, in such arrangement, a large number of print servers may be needed, because of the number of users and number of printers, in order to process the large number of print jobs that may need to be processed, in an acceptable amount of time. The greater the number of print servers, the more administration and maintenance required from the administrator(s).

There is a need for an improved approach for a user to have access conveniently to a large number of printers.

SUMMARY

Various tools (for example, a system, an apparatus, executable print application program, a method, etc.) can be configured to enable a user, without administrative login, to install on the user terminal a device driver for a user-selected printer, by merely selecting the specified printer, so that the user can obtain the benefit of printing functionality from the specified printer shortly thereafter, without depending on an administrator to install the device driver.

For example, a printer selection interface may be provided to communicate with a print server to receive a listing of printers selectable by the user, display the listing of printers, receive user selection of a printer amongst the listing of printers, communicate with the print server to request a print driver for the user-selected printer, and receive an installer package from the print server. Further, a printer installation module, upon the user terminal receiving the installer package, creates an installation scenario file to perform plural actions, including (a) an action to execute the installer package, and in addition (b) an action to create a port to access the installed printer directly without communicating further with the print server.

All of the aforementioned actions are executable on the user terminal without administrative login by the user. The sole action that may be required by the user is to select the printer (and in some instances, no action by the user is required, such as if the user is limited to a small group of devices) and all of the other actions can be automated, without requiring the user to have insight (which the user may not have) regarding the system. The user can soon thereafter submit print jobs directly to the printer (that is, the print job is not submitted to the print server), and the print server does not play any further role in the print process (other than having facilitated installation of the required device driver). Since the user can have benefit of such virtually instantaneous print functionality, without the need for submitting the print job to a print server, the number of print servers can be greatly reduced, and the amount of installation and maintenance work required from the administrator is likewise reduced.

In another aspect, the installation scenario file created by the printer installation module may include an action to determine a network address of the installed printer and install a port monitor corresponding to the network address of the printer, and/or an agent directed to the network address of the printer, to facilitate the automated process.

In another aspect, a driver update module may be provided to update each driver installed by the print application. Upon the print application being opened, the driver update module checks for available update of the driver, and if driver update is available, the driver update module executes the available driver update. As another example, the driver update module checks, upon the print application being opened, for driver update pushed by the print server to the user terminal, and if the driver update has been pushed by the print server to the user terminal, the driver update module executes the driver update. In another example, when the user selects a particular installed printer in the print application, the driver update module checks for available update of the driver of the particular installed printer, and if driver update is available, the driver update module executes the available driver update.

In another aspect of this disclosure, a method for automatically installing device drivers on a network-connected user terminal may include one or more of the following:

providing a printer selection interface that displays a listing of network-connected printers and receiving user selection of a specified printer selected from the listing of network-connected printers;

communicating with a print server to obtain a printer installer package for the user-selected printer, from the print server;

generating on the user terminal, upon receipt of the printer installer package, an installation scenario file to perform plural actions, including (a) an action to execute the installer package, and in addition (b) an action to create a port to access the installed printer directly without communicating further with the print server, wherein all of the plural actions of the installation scenario file are executable on the user terminal without administrative login on the user terminal;

displaying the listing of printers on the printer selection interface as printer icons corresponding to the respective printers in the listing;

including in the installation scenario file an action to determine a network address of the installed printer and install a port monitor corresponding to the network address of the printer;

including in the installation scenario file an action to determine a network address of the installed printer and install an agent directed to the network address of the printer;

performing, before executing the installer package, in a case that the installer package is received as a signed package from the print server, a signature verification of the signed installer package.

Many other aspects, features and advantages can be included, as discussed herein.

BRIEF DESCRIPTION OF THE DRAWINGS

The aforementioned and other aspects, features and advantages can be more readily understood from the following detailed description with reference to the accompanying drawings wherein:

FIGS. 8A-8G show respective examples of user interface screens that can be provided by a print application or on a user terminal, in accordance with an exemplary embodiment;

FIGS. 9A-9B show respective examples of a scenario file, in accordance with an exemplary embodiment;

DETAILED DESCRIPTION

Figure 1:
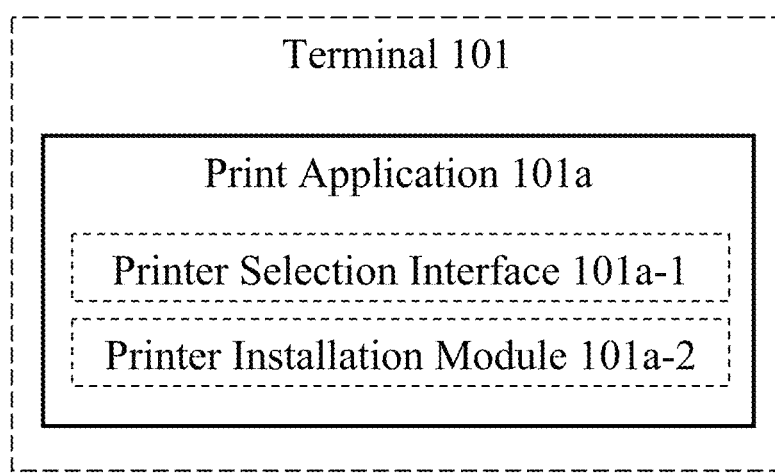
FIG. 1 shows a block diagram of a print application, provided on or to a user terminal, which is configured for automatically installing a device driver, in accordance with an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted where it may obscure the inventive aspects discussed in this disclosure. Referring now to the drawings, wherein like reference numerals designate identical or corresponding parts throughout the several views, there are described tools (such as systems, apparatuses, methodologies, computer program products, etc.) for automating installation of device drivers.

In the example shown schematically in FIG. 1, print application 101*a* which is provided to or on terminal 101 includes a printer selection interface 101*a*-1 and a printer installation module 101*a*-2.

The terminal 101 can be any computing device, including but not limited to a personal, notebook or workstation computer, a kiosk, a PDA (personal digital assistant), a mobile phone or handset, another information terminal, etc., that can communicate with other devices through the network 104. The terminal 101 is further described infra with reference to FIG. 5.

The print application 101*a* shown in FIG. 1 focuses on inventive aspects in connection with device driver installation. Although not shown in FIG. 1, it should be understood that the term "print application" can refer to any application software that may provide a user with user interface functions to submit a print job. Such application software may be stored in memory of the terminal 101 and/or may be downloaded from an external source.

The printer selection interface 101*a*-1 performs communication with a print server (such as 102 in FIG. 2A) to obtain a listing of printers and an installation package. When a user of the terminal 101 operates the interface to access print functionalities, the printer selection interface 101*a*-1 sends a request to the print server for a listing of available printers. In response, the print server sends the listing of printers back to the terminal 101. The printer selection interface 101*a*-1 then displays this listing to the user. The user may perform searches to narrow the listing down until the user is able to find the printer that the he or she wants. Once the user has selected a printer from the list, the printer selection interface 101*a*-1 sends a request to the print server once more for a device driver corresponding to the printer which was selected previously. In response, the print server sends the terminal 101 an installation package which includes the requested device driver.

The print installation module 101a-2 facilitates the creation of an installation scenario file. The installation scenario file may be any type of file and can be encoded in a variety of languages (i.e. C, C++, C#, Visual Basic, Python, Ruby, Perl, etc.). The installation scenario has two primary tasks. The first primary task is that it automatically performs the execution of the installer package which allows the device driver received from the print server to be installed on the terminal 101. The second primary task that the installation scenario file performs is that it facilitates the opening or creating of a port from which the printer 103 or the MFP 104 may connect to the terminal 101. It should be noted that the installation scenario file is automatically created after the installation package is received. Further, the process of installing the device driver and opening of the port is performed transparently and requires no user interaction. Moreover, due to the process being automated, the user does not have to be logged in as administrator to do this.

Figure 2A:
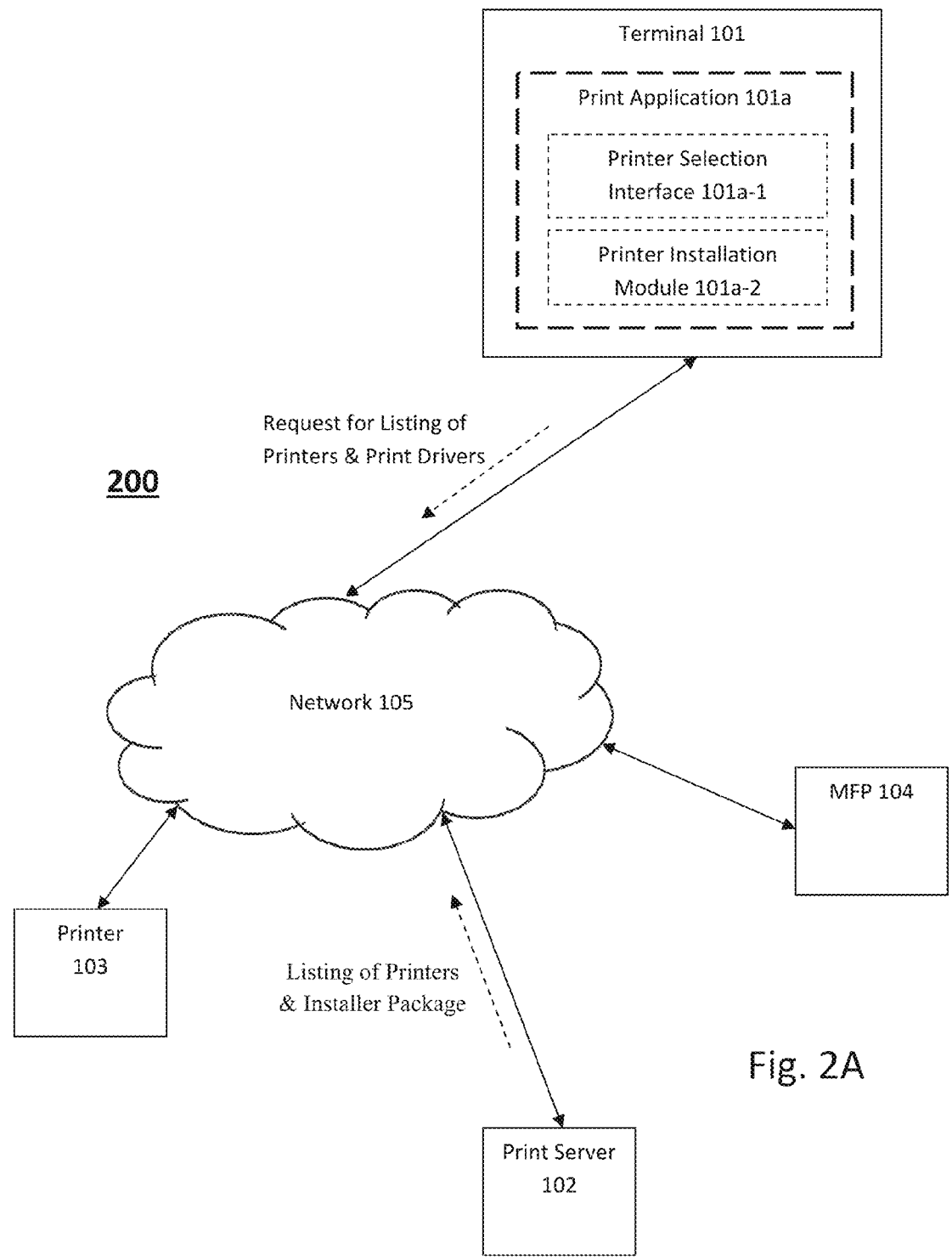
FIG. 2A shows a block diagram of a system in which a user terminal is provided with a print application configured to automatically install a device driver, in accordance with an exemplary embodiment.

FIG. 2A shows schematically a system 200 that includes a terminal 101, a print server 102, a printer 103 and an MFP 104, all of which are interconnected by network 105. Although only one user terminal is shown in FIG. 2A, it should be understood that the system 200 can include a plurality of terminals (which can have similar or different configurations).

The terms "printer" and "printer device" are used hereinafter generically to include any output device having a printing or plotting functionality, and include multifunction devices having a copy and/or scanning functionality in addition to the printing or plotting functionality.

The print server 102 communicates with the printer 103 and the MFP 104 in order to obtain information from each of them. Such information may include name/identifier (device name, walkthrough ID, Asset tag, etc.), type (printer, MFP, scanner, etc.), functions (black & white, duplex, fax, scanning, N-up, etc.), physical location, network address (IP address, MAC address, etc.), output technology (laser, inkjet solid ink, thermal, other technology, etc.) supply level (consumable types such as paper and toner>empty/low/ok, etc.), pages per job (e.g., 1, 2, 6-10, etc.), color technology (professional color, convenience color, etc), properties (manufacturer, model, serial number, etc). The user may request the print server 102 for the above-mentioned information.

In addition, the print server 102 also stores device drivers which correspond to the printers (i.e. printer 103, MFP 104). Consequently, when a user wants to obtain a device driver in order to communicate with a printer connected to the same system, the user may request one from the print server 102. In response, the print server 102 may send back an installation package containing the device driver. Further, the print server 102 may also constantly and actively check updates for device drivers. When the print server 102 detects an update, it may push the update to all the terminals that have the device driver corresponding to the update. The print server 102 is further described infra with reference to FIG. 4

Figure 6:
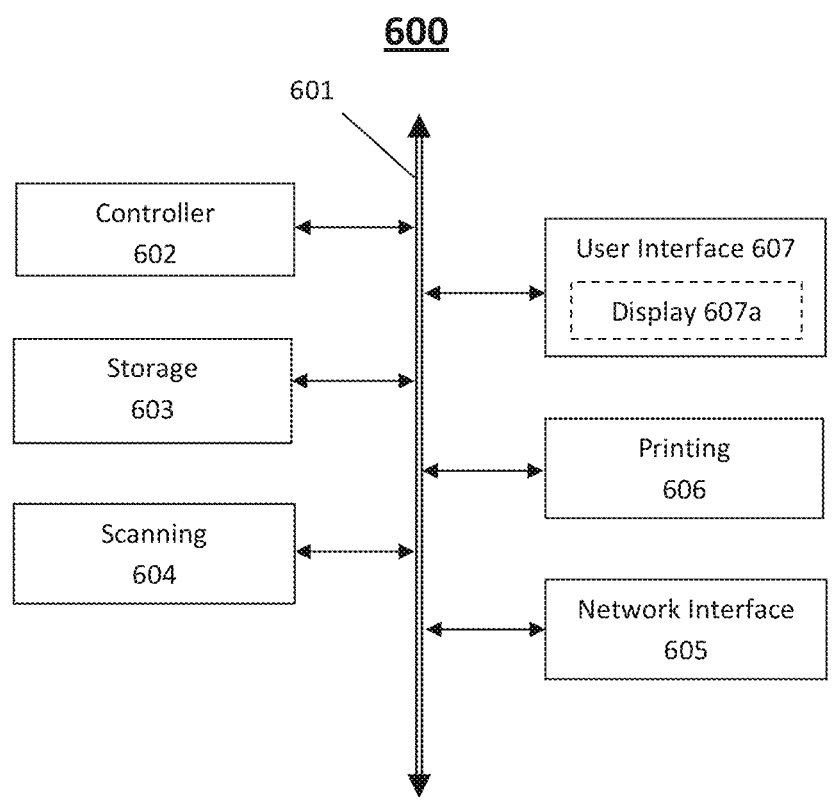
FIG. 6 shows a block diagram of an exemplary configuration of a multi-function device.

The MFP 104 can be, for example a printer/scanner, printer/scanner/fax, etc. While this example of this disclosure simply refers to a single MFP 104 and a single printer 103 in the interest of brevity, it should be appreciated that the network environment can have an arbitrary number of printer and MFP devices. The MFP 104 may be configured as shown in FIG. 6, which is discussed infra.

The network 105 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 105. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2B:
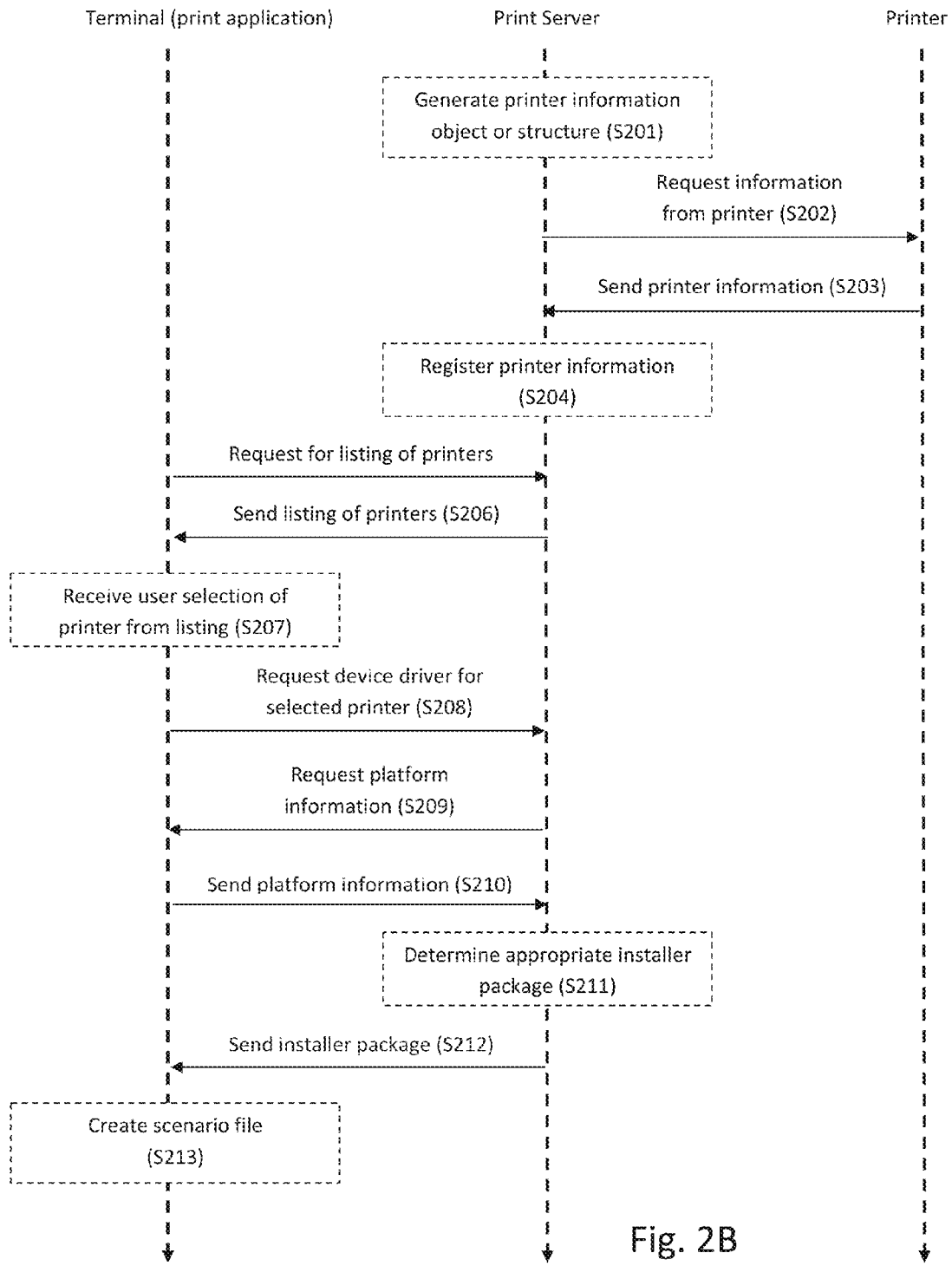
FIG. 2B shows a schematic diagram of an example of communication flow in the system shown in FIG. 2A, in accordance with an exemplary embodiment.

FIG. 2B shows a process performed in, for example, the system 200 (illustrated in FIG. 2A), according to an exemplary embodiment.

One of the tasks that the print server performs is to generate an object or structure for registering a listing of available printers (step S201). The print server sends a request for information (i.e. network address, printer properties, driver types, etc.) to each printer in the system (step S202). It should be noted that although only one printer is shown in the process, there could be a plurality of printers in the system. In response to this request, each of the printers in the system sends back to the print server the information requested (step S203). Next, after receiving the information from each printer, the print server adds it to the listing (step S204).

In another example, the object or structure for registering a listing of available printers may be populated by an administrator. For example, the administrator may create a folder of icons corresponding to installer packages for respective printers that are made available. As another example, the administrator may associate each user profile or each group of users with such a folder corresponding to the user profile or group of users. Thus, some users can install any printer that are indicated in one folder made available to such users, while another user can access a different folder including a different group of devices.

When the print server receives a request for the listing of available devices from a user terminal (step S205) and after determining the devices that the user is permitted to access, the print server returns a listing of such devices to the user terminal (step S206). Next, the user may trim the list via keywords and/or select a device from the list (step S207), and then the user terminal communicates the user selection of the desired device to the print server (step S208). When the user selection is received, the print server responds in turn by asking for the platform information of the terminal (step S209). When such platform information (e.g., Windows XP, Windows 7, iOS, Android, Linux, etc.) is received (step S210), the print server determines the appropriate installer package for the terminal and confirms that the terminal can utilize it (step S211). It should be appreciated that steps S208-S211 can be replaced by a single step if the user selection is communicated with all of the required information.

After determining the appropriate installer package, the print server sends it to the terminal (step S212). After receiving the installer package, the terminal creates a scenario file which executes the installer package and creates a port to access the printer (S213).

The scenario file, as discussed further infra, is configured to include all of the actions that are needed to properly install a device driver, so as to allow the user terminal to communicate directly with the printer via the port created by the scenario file. Thus, such actions are automated and no further administrator action is required and administrator login by the user is not required. Further, print jobs can be submitted directly to the printer, without routing the print jobs through a print server.

Figure 3:
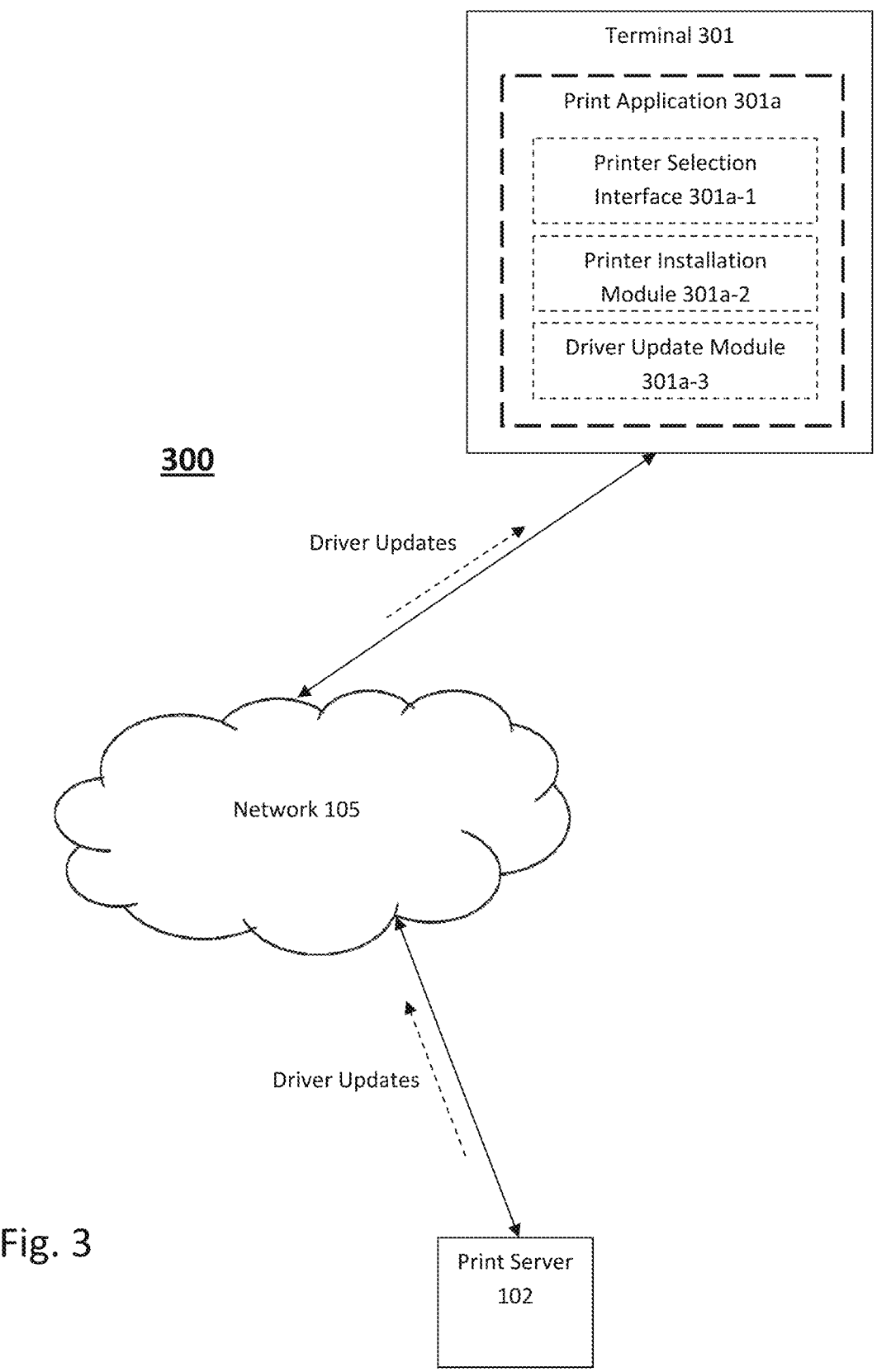
FIG. 3 shows a block diagram of a system configured for automated maintenance of print provisions, in accordance with an exemplary embodiment.

FIG. 3 shows schematically a system 300, according to another exemplary embodiment. The system 300 is similar to the system 200 of FIG. 2A except that the terminal 101 in the system additionally includes a driver update module 301a-3.

The driver update module 301a-3 provides updates to the device drivers currently installed on the terminal 301. When a user first opens the print application 301a, the print application 301a checks whether there is a new version of a device driver or an update by communicating with the print server 102. This check is performed for each device driver that is installed on the terminal 301. In a case in which there is at least one device driver installed on the terminal 301 that has a new update, the driver update module 301a-3 downloads the update from the print server 102 and executes the driver update.

In an exemplary embodiment, the printer server 102 may send updates to the terminal 101 instead. When a user first opens the print application 301a, the print application 301a checks whether the print server 102 has pushed driver updates corresponding to the device drivers currently stored on the terminal 301. In the case that one or more driver updates have been pushed to the terminal 301, the driver update module 301a-3 executes the driver update.

In another exemplary embodiment, the driver update module 301a-3 provides updates to the device drivers installed on the terminal 301 whenever the user checks on a particular device driver. For example, when the user selects one of the printers, the driver update module 301a-3 may check for any updates that are available for the particular device driver. In the case that there is an update, the terminal 301 may either present to the user that there is an update available or driver update module 301a-3 may transparently update the device driver (i.e. the user is not made aware of the update process).

Otherwise, operations of the elements of the system 300 are similar to those discussed in connection with the corresponding elements of the system 200 of FIG. 2A.

Figure 4:
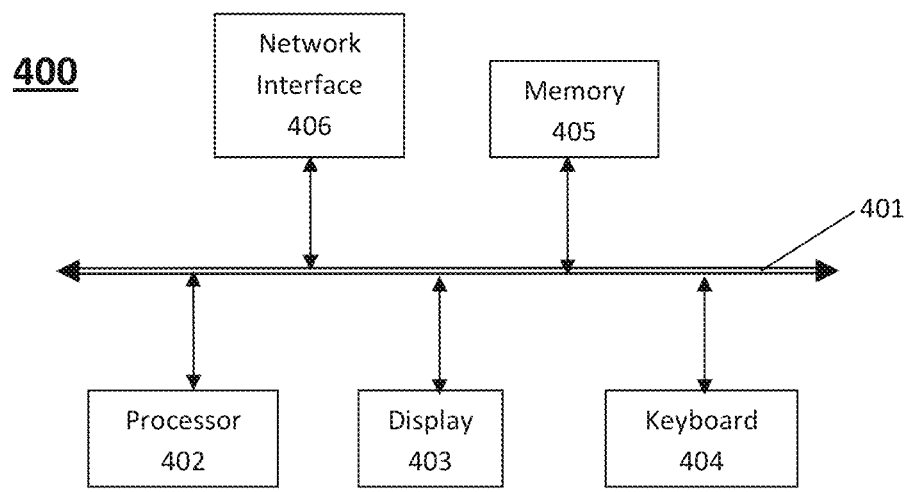
FIG. 4 shows a block diagram of an exemplary configuration of a terminal apparatus.

FIG. 4 shows an exemplary constitution of a computer 400 that can be configured (for example, through software) to operate (at least in part) as the print server 102 of FIGS. 2A-3. As shown in FIG. 4, the computer 400 includes a controller (or central processing unit) 402 that communicates with a number of other components, including a memory or storage part 403, keyboard 404, a memory or storage part 405 and network interface 406, by way of a system bus 401. The computing device 400 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 5:
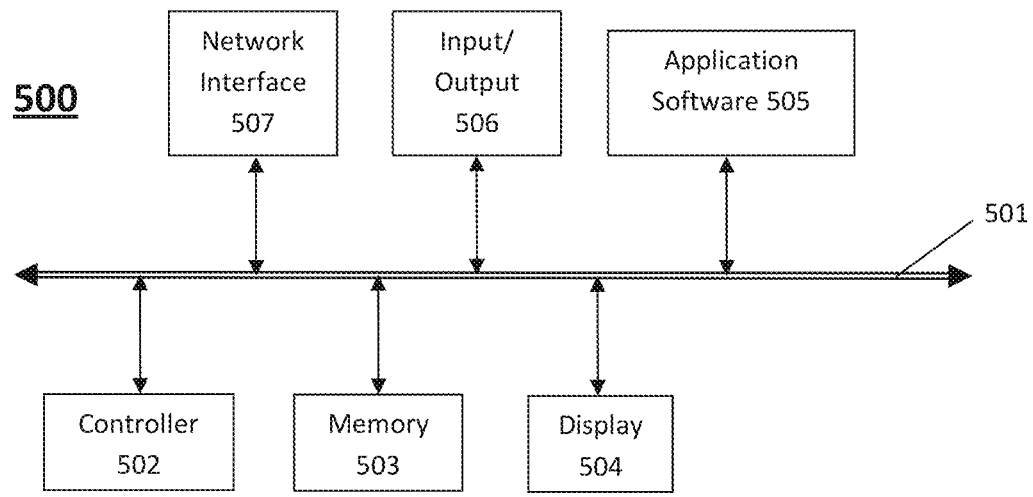
FIG. 5 shows a block diagram of an exemplary configuration of a computing device.

FIG. 5 shows an exemplary constitution of a terminal (such as terminal 101 of FIG. 1-2B; and 301 in FIG. 3). In FIG. 5, a terminal 500 includes a controller (or central processing unit) 502 that communicates with a number of other components, including memory 503, display 504, application software 505, input/output (such as mouse, keyboard, touchpad, stylus, microphone and/or speaker with voice/speech interface and/or recognition software, etc.) 506 network interface 507, by way of an internal bus 501.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 507 provides a connection (for example, by way of an Ethernet connection or other network connection which supports any desired network protocol such as, but not limited to TCP/IP, IPX, IPX/SPX, or NetBEUI) to the network to which the computer 500 is connected (e.g., network 105 of FIGS. 2A and 3).

The application software 505 is shown as a component connected to the internal bus 401, but in practice are typically stored in storage media such as a hard disk or portable media, and/or received through the network, and loaded into memory 503 as the need arises.

Additional aspects or components of the computer 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 6 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities.

The MFP 600 shown in FIG. 6 includes a controller 602, and various elements connected to the controller 602 by an internal bus 601. The controller 602 controls and monitors operations of the MFP 600. The elements connected to the controller 602 include storage 603 (for example, random access memory, read-only memory, hard disk drive, portable storage media drive such as for optical discs, magnetic discs, magneto optical discs, etc., semiconductor memory cards, combinations of storage media, etc.), scanning 604, a network interface (I/F) 605, printing 606 and a user interface 607.

Storage 603 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 603 and executed by the controller 602 to carry out the instructions. Such instructions can include instructions for performing specified functions (such as printing, scanning, faxing, copying, e-mailing, etc.) of the MFP 600, to enable the MFP 600 to interact with a terminal, as well as perhaps other external devices, through the network interface 605, and interactions with users through the user interface 607.

The network interface 606 is utilized by the MFP 600 to communicate with other network-connected devices such as a terminal and receive data requests, print jobs, user interfaces, and etc.

The user interface 607 includes one or more electronic visual displays that display, under control of controller 602, information allowing the user of the MFP 600 to interact with the MFP 600. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 600, so as to allow the operator to interact conveniently with services provided on the MFP 600, or with the MFP 600 serving as terminal for accessing electronic data or other content through the network. User interfaces or other contents received through the network via the network interface 605 can be displayed on the display screen.

The display screen does not need to be integral with, or embedded in, a housing of the MFD 600, but may simply be coupled to the MFD 600 by either a wire or a wireless connection. The user I/O 607 may include keys and/or buttons (such as graphical keys or buttons, or other graphical elements, of a GUI on a touchscreen display) for inputting information or requesting various operations. Alternatively, the user I/O 607 and the display screen 607a may be operated by a keyboard, a mouse, a remote control, voice recognition, or eye-movement tracking, or a combination thereof.

Scanning 604, printing 606, and network interface 605 are otherwise conventional, and therefore, a detailed description of such conventional aspects is omitted in the interest of clarity and brevity.

The MFP 600 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 7A:
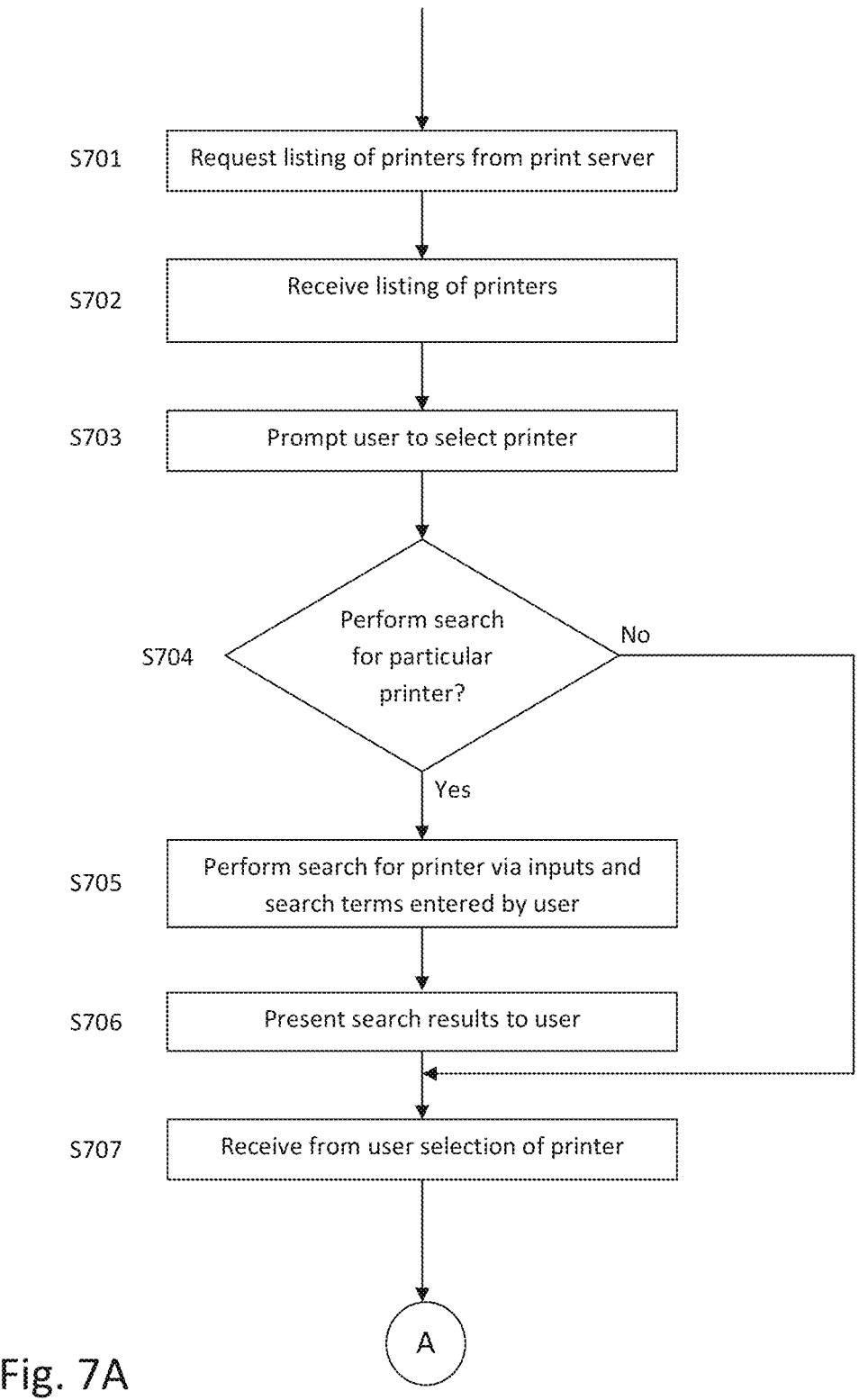
FIGS. 7A-7B show a flow chart of a method that can be performed by any of the terminals shown in the preceding drawings.
Figure 7B:
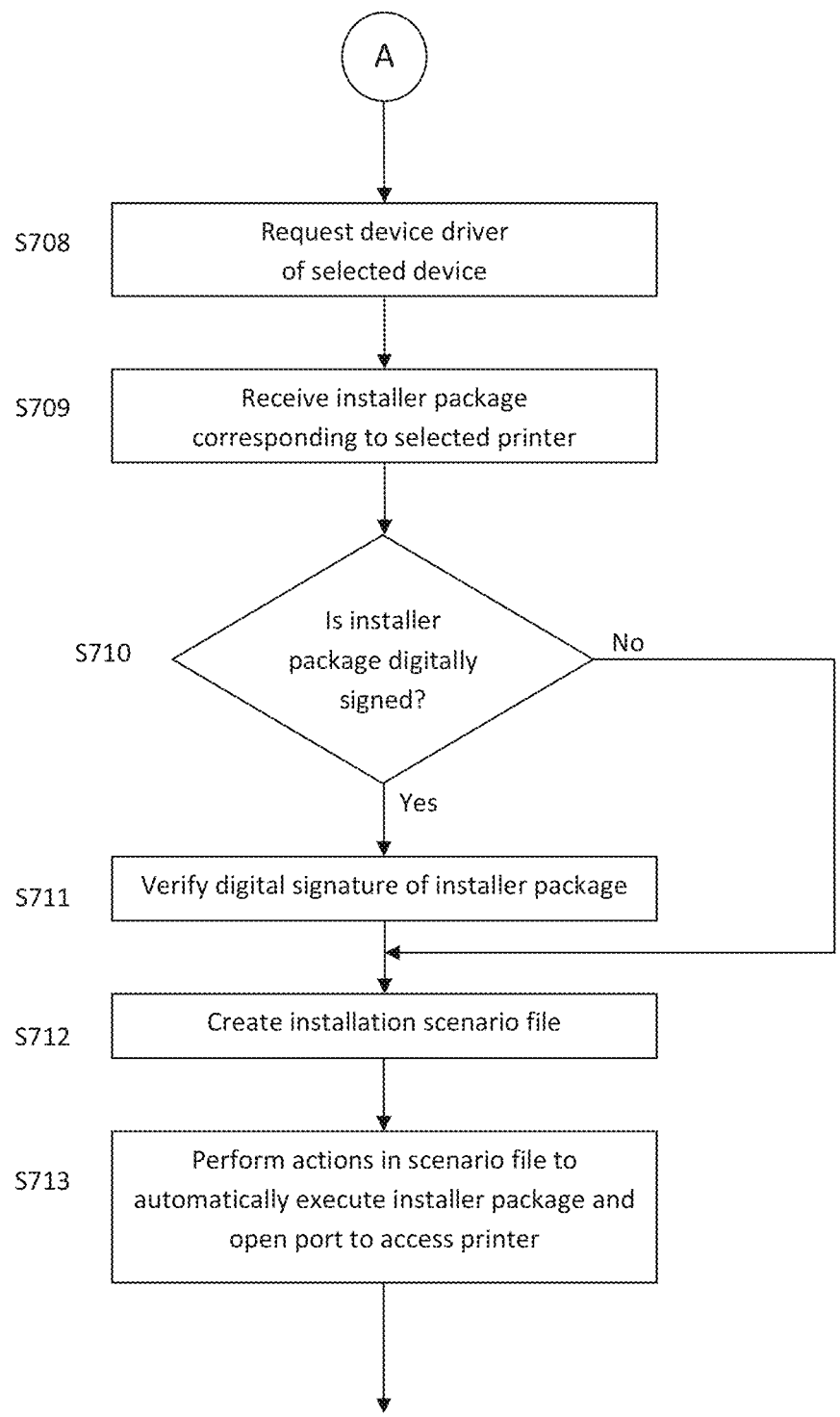

FIG. 7 shows a process performed by a terminal (e.g., 101), for obtaining device drivers, according to an exemplary embodiment.

Figure 8A:
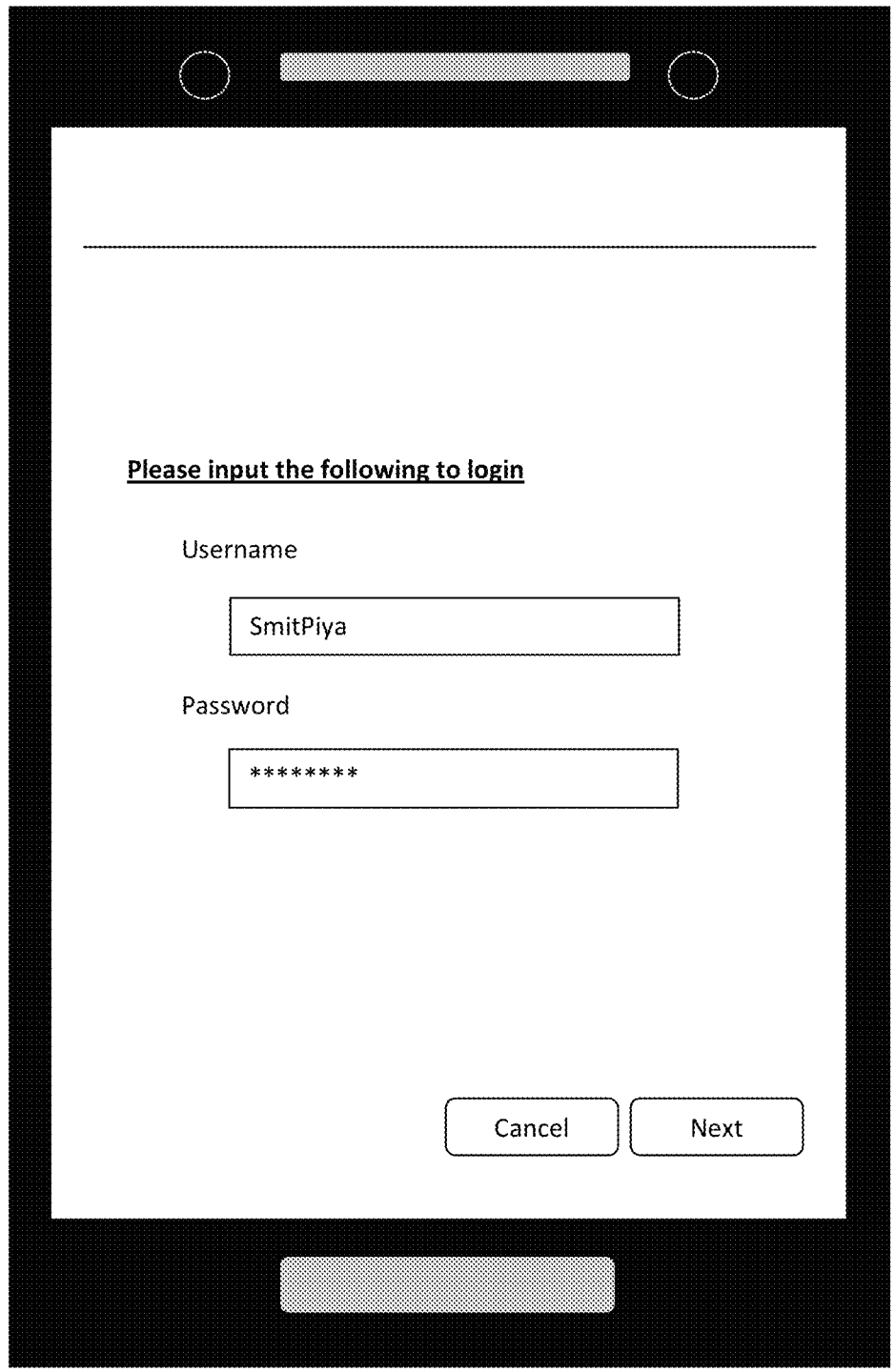
Figure 8B:
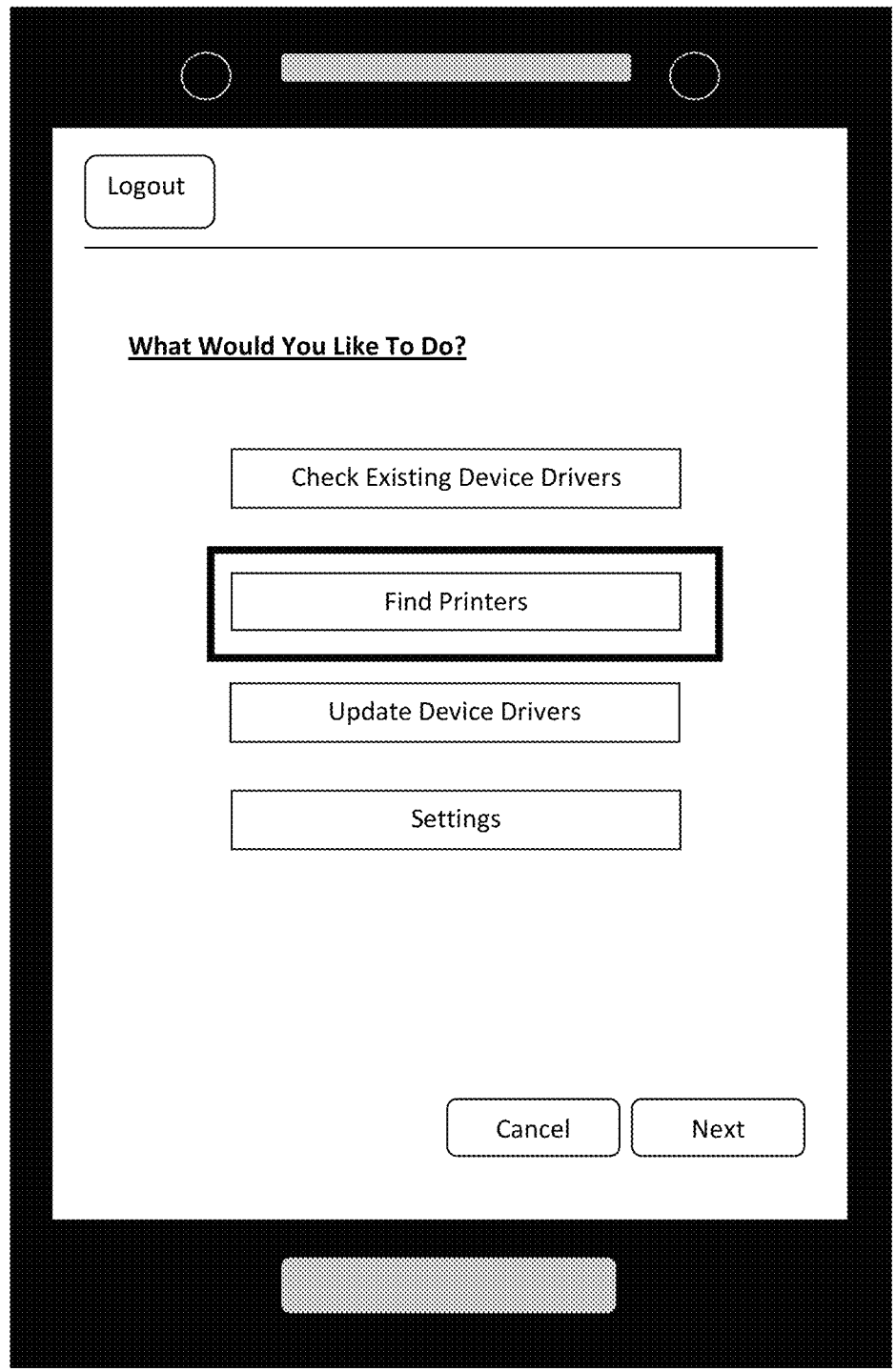

The user may be required to log into a print application provided on or to the terminal 101, such as via the user interface screen shown by way of example in FIG. 8A. While in the print application, the user, such as via the user interface screen shown in FIG. 8B, may be provided with multiple options such as "Check Existing Device Drivers", "Find Printers", "Update Device Drivers" and "Settings". In the "Check Existing Device Drivers" option, the user can check the devices to which the user has access. In addition, the user can view the details of the device drivers, such as version, download date, size, platform, etc. The user can select the "Find Printers" option to search for printers and if necessary, download the corresponding print drivers. The "Update Device Drivers" option allows the user to update print drivers on the terminal.

Figure 8C:
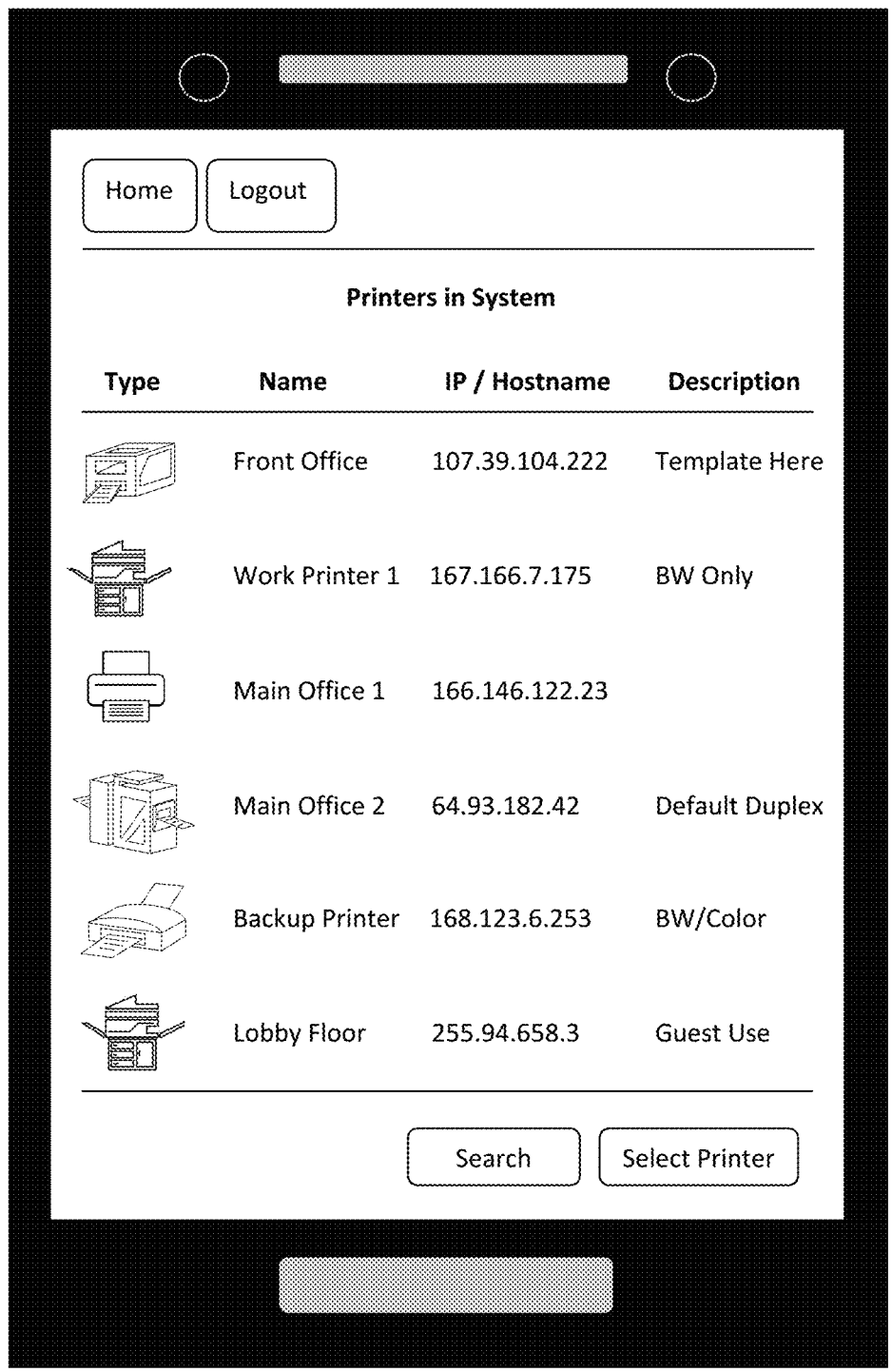

In this case (FIG. 8B), the user has selected the "Find Printers" option. After receiving the request from the user to search for printers (step S701), the terminal 101 presents the user with a listing of available printers (step S702), as illustrated in FIG. 8C. As shown, the listing includes, in this case, four categories which are "Type", Name", "IP/Hostname" and "Description". The "Type" category displays an icon of the printer that may represent the physical features of the printer in the physical world. For example, if a printer has a certain property, this may be reflected in the icon. On the other hand, the icon may also reflect the type of printer. The "Name" category displays the identifier of the printer. For example, an administrator who has installed a MFP may elect to create a unique identifier that is user friendly. The identifier may describe the location of the printer or the model and type. The "IP/Hostname" may be the internet address of the printer (i.e. IP address, MAC address). The "Description" category may be notes or features about the printer. For example, one printer may print only in black-and-white, while another prints in duplex by default. Another may be for visitors or guests only.

Figure 8D:
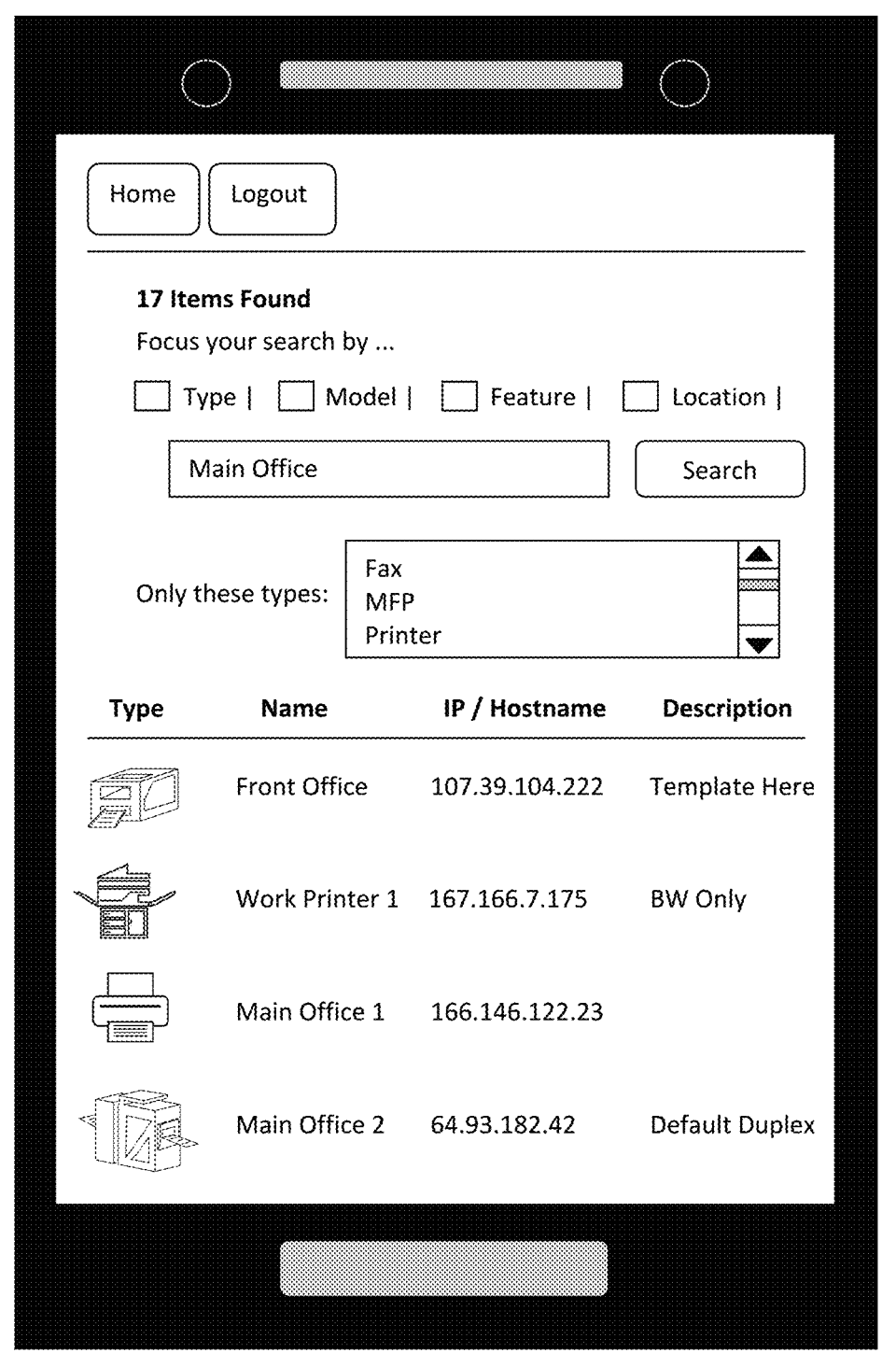

The terminal 101 may prompt the user to select a printer from the listing (step S703). In some cases, there may be numerous devices in the listing and consequently it may be difficult for the user to find a desired printer by scanning or scrolling through the listing. Therefore, the user interface (FIG. 8C) may allow the user to perform a search (step S704). In the case that the user would like to search for a printer (step S704, yes), the user may press the "Search" button which causes the terminal 101 to present the user with the screen shown in FIG. 8D. Here, the user may have a variety of ways to perform the search or at least narrow the listing down to a sizable portion. For example, the user may select to narrow the listing based on the categories "Type", "Model" or "Feature" or "Location". In addition, the user may also narrow the listing based on the device type (i.e. fax machine, MFP, printer, scanner). After receiving the inputs or search terms from the user the terminal performs the search (step S705) and presents to the user the result of the search via a listing shown at the bottom of the screen (step S706). It should be noted that every time the user performs a new search the listing changes dynamically in response to this.

Figure 8E:

In addition, the user may also narrow the listing down even further. In this case, the user may perform the search based on the geographical location of the printer. For example, as illustrated in FIG. 8E, the user may select a "Country", "State" and "City" as ways to narrow the list. In this case the user has selected "USA" for "Country", "Alabama" for "State" and "Birmingham" for "City". Like previously, the listing at the bottom of the screen may change dynamically in response to the user selections. Thus, the listing of printers shown after the user has made the selections may now contain printers that are located in Birmingham, Ala., USA.

Figure 8F:
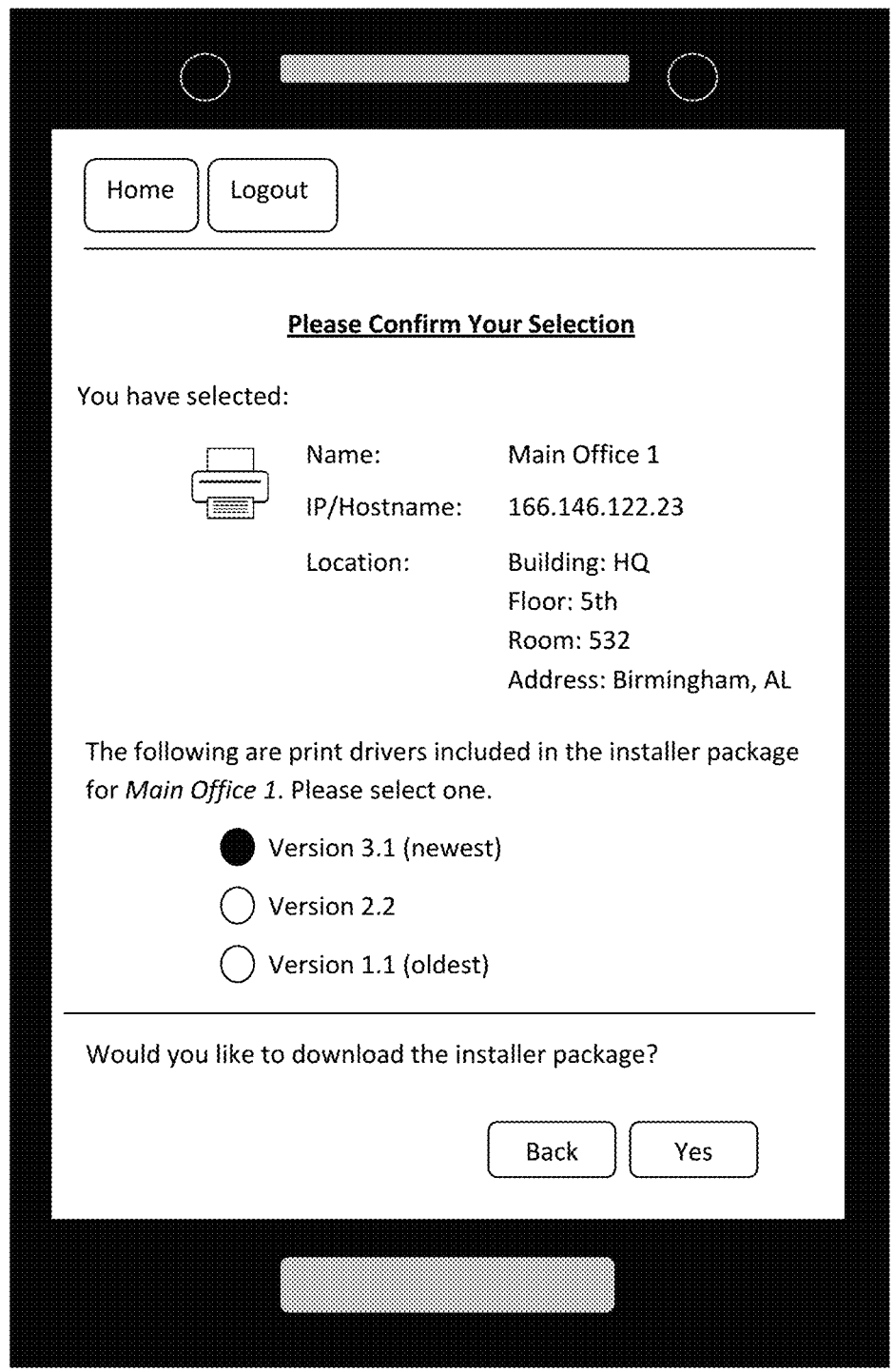

After performing the search or in the case that the user has selected not to perform the search (step S704, no), the terminal receives the selection made by the user (step S707) and presents the user with a screen as illustrated in FIG. 8F. Here, the user is presented with more information about the printer as well as the drivers that the user can download. For example, as shown, there are three device drivers which include the versions "3.1", "2.2" and "1.1". The user is also presented with information on which of the device drivers are new and which are old. Thus the user may select from any of these options. After the user has confirmed the selection, the terminal 101 communicates with the print server 102 which is connected to the system and requests the print driver corresponding to the printer that the user has selected (step S708). In addition, the terminal 101 may also transmit the user credentials of the user to the print server 102 as well. In this case the user is allowed to access the printer that he or she has previously selected the print server 102 may comply with the request of the terminal 101. On the other hand, if the user is not able to access the printer, the print server 102 refuses the request and the user is informed of this via the terminal 101.

After receiving the installer package which contains the device driver from the print server 102 (step S709), the terminal 101 determines if the installer package is digitally signed or not (step S710). In the case that it is digitally signed (step S710, yes), the terminal 101 proceeds to verify the digital signature (step S711, no). For example, the installer package may be signed with a digital certificate. Thus, the terminal 101 may use the public key of the print server 102 to verify the authenticity of the installer package. Otherwise, in the case that the installer package is not digitally signed (step S710, no), the user may be prompted by the terminal 101 to decided whether or not to accept the installer package. Afterwards, the terminal 101 creates an installation scenario file (step S712) and then the actions in the installation scenario file are performed (step S712). The installation scenario file may be any type of file and can be encoded in any of a variety of languages (i.e. C, C++, C#, Visual Basic, Python, Ruby, Perl, etc.).

In the example shown in FIG. 9A of such an installation scenario file, the installation scenario file includes an action ("get" function) to obtain the installer package (InstallerPackage). In this case, the object "package" is set to the result of the "get" function. Such result is checked to determine whether the installer package includes a device driver for the printer previously selected. In the case that the package does not include a driver, an output message is send to the user. Otherwise, the device driver is installed. Afterwards, a port corresponding to the printer is created and the variable "Port" is set to it. The port may be any port that is not yet reserved or used. Then, the address of the printer is obtained and the variable "Address" is set to it. The final step in the process involves installing a port monitor. The port monitor checks the status and changes made to the port that it is monitoring. For example, if the port monitor may notify the user if the port it is monitoring is not functioning correctly or if the port is closed or deleted. In this case the port monitor is installed and associated with the port of the terminal 101 and the host address of the printer that was previously selected.

Figure 8G:
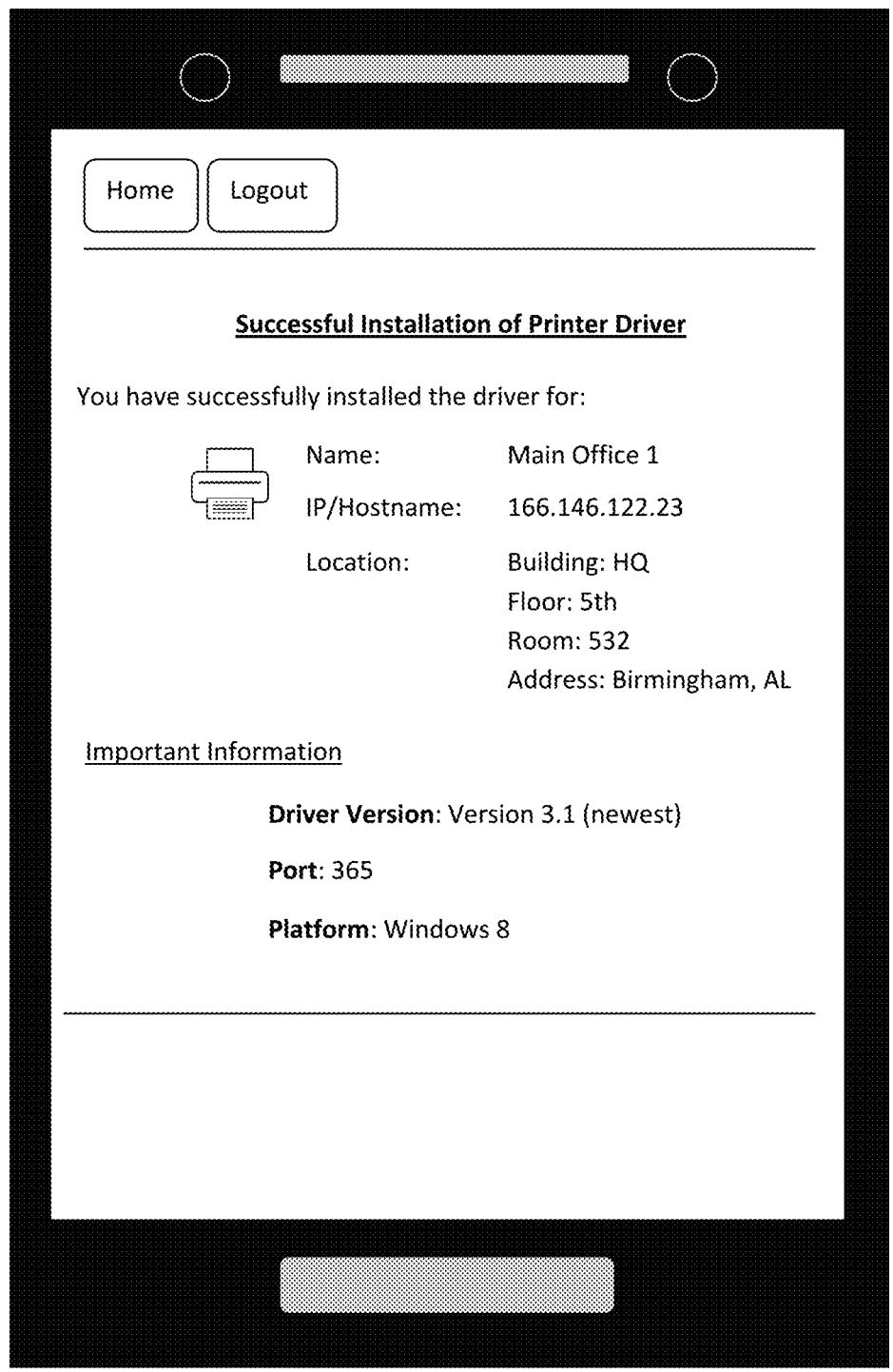

After the installation scenario file has completed the process, the user is presented with the screen illustrated in FIG. 8G. As shown, the user is presented with the information on the printer as well as other details. These details may include the driver version of the device driver that was installed, the port number of the terminal 101 that is now connected to the printer, and platform of the terminal 101.

In an exemplary embodiment, a software agent, which is transparent to the user, may be utilized as shown in FIG. 9B. This may be facilitated by installing an agent directed to the network address of the printer. The agent may be used for a variety of tasks such as collecting data between the printer and the terminal or gathering printing information. As shown in FIG. 9B, the agent is installed via an action of the installation scenario file. In this case, the action to install the agent replaces the action to install the port monitor (in FIG. 9A). However, it should be noted that this is not always the case. It may be that both codes are in the installation scenario file. The host address of the printer obtained previously is used to direct the agent to it. Thus, the agent may perform actions such as monitoring, gathering print job information or checking the status of the connection.

Figure 10:
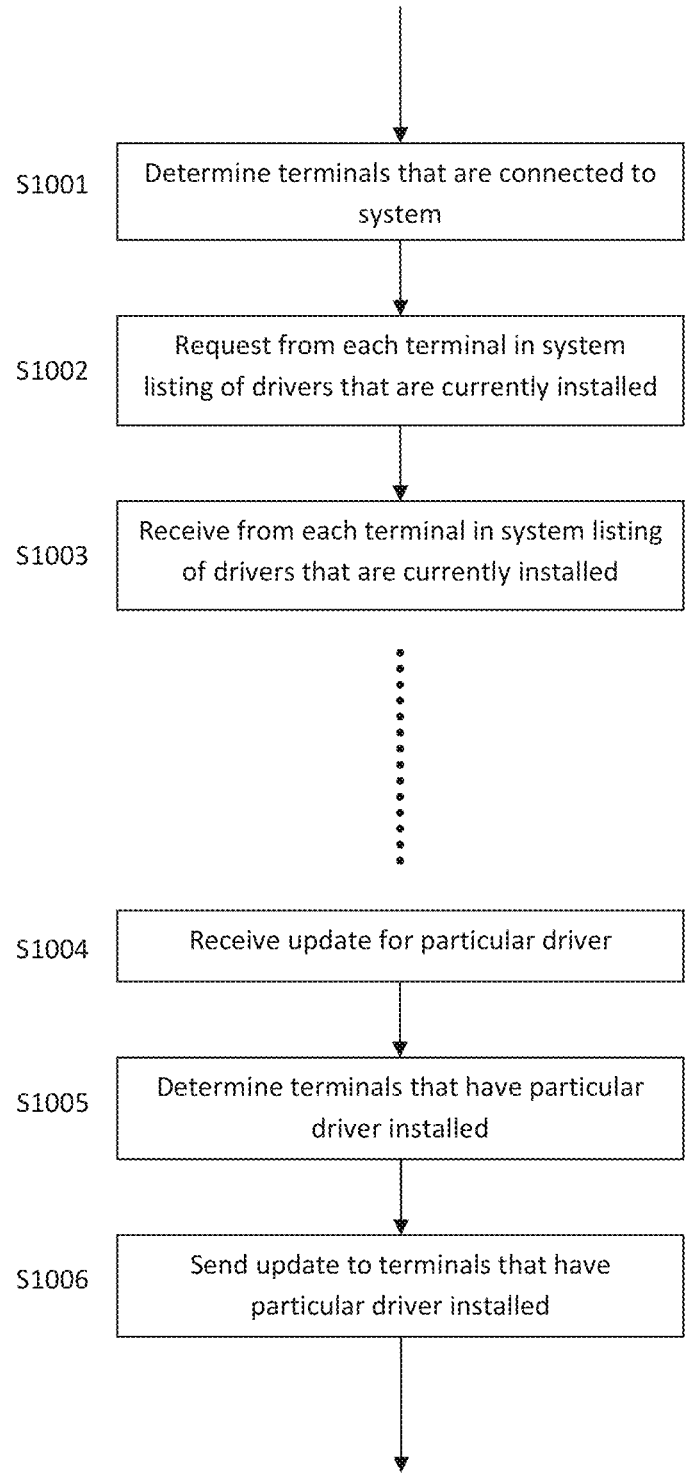
FIG. 10 shows a flow chart of a method performed by a print server, in accordance with an exemplary embodiment.

FIG. 10 shows a process performed by a print server (e.g., 102), for updating device drivers, according to an exemplary embodiment.

The print server 102 stores device drivers and information for each device (MFPs, printers, etc.) that is currently connected to the same system as the print server 101. The printer server 102 facilitates this by first determining the terminals that are connected to the system (step S1001). Next, the print server 102 requests from each terminal information host address (IP, MC), platform (i.e. Windows, Unix, Linux, Mac OS, iOS, Android, etc.), model, type (smartphone, tablet, PC, PDA, etc.), etc. The print server 102 also requests from each terminal a listing of device drivers currently installed on the terminal (step S1002). Next, the print server 102 stores this information onto a storage device. Further, the print server 102 constantly and actively checks for device driver updates through a variety of sources (i.e. internet). After an indeterminate amount of time, the print server 102 may receive a device driver update for at least one of the device drivers (step S1004). When this happens, the print server 102 determines the terminals that have device drivers installed which correspond to the update (step S1005). Next, the print server pushes the update to the terminals (step S1006).

The orders in which the steps are performed in the aforementioned methods are not limited to those shown in the examples of FIGS. 2B, 7A-7B and 10, and may be switched as long as similar results are achieved. Also, it should be noted that the methods illustrated in the examples of FIGS. 2B, 7A-7B and 10 may be implemented using any of the systems described in connection with FIGS. 2A and 3.

The aforementioned specific embodiments are illustrative, and many variations can be introduced on these embodiments without departing from the spirit of the disclosure or from the scope of the appended claims. For example, various aspects, features and advantages disclosed herein can applied to automate device driver installation, even when the device for which the driver is needed does not have any print functionality. Further, although the aspects, features and advantages are discussed herein in connection with a print application, it should be understood that such aspects and feature may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A non-transitory computer readable medium embodying one or more programs of instructions executable by a computer, wherein the one or more programs of instructions executed by the computer comprises:

a printer selection interface to communicate with a print server to receive a listing of printers selectable by a user of the computer, display the listing of printers, receive user selection of a printer amongst the listing of printers, communicate with the print server to request a print driver for the user-selected printer, and receive an installer package from the print server; and a printer installation module that automatically creates, upon receipt of the installer package from the print server, an installation scenario file on the computer, the installation scenario file including plural executable actions executable by the computer without administrative login on the computer, the plural actions in the installation scenario file that are executable by the computer without administrative login on the computer including (a) an executable action to automatically execute the installer package on the computer to install the print driver corresponding to the user-selected printer, and in addition (b) an executable action to create a port on the computer, wherein said port created on the computer without administrative login permits, in response to the user selection of the printer amongst the listing of printers, access to the installed printer directly without communicating further with the print server.

2. The non-transitory computer readable medium of claim 1, wherein the listing of printers is displayed by the printer selection interface as printer icons corresponding to the respective printers in the listing.

3. The non-transitory computer readable medium of claim 1, wherein the plural actions in the installation scenario file created by the printer installation module include an action to determine a network address of the installed printer and install a port monitor corresponding to the network address of the printer.

4. The non-transitory computer readable medium of claim 1, wherein the plural actions in the installation scenario file created by the printer installation module includes an action to determine a network address of the installed printer and install an agent directed to the network address of the printer.

5. The non-transitory computer readable medium of claim 1, wherein the installer package received from the print server is a signed package, and the printer installation module performs a signature verification of the signed installer package before executing the installer package.

6. The non-transitory computer readable medium of claim 1, the one or more programs of instructions executed by the computer further comprising a driver update module to update each driver installed on a terminal, wherein for said each driver, the driver update module checks for available update of the driver, and if driver update is available, the driver update module executes the available driver update.

7. The non-transitory computer readable medium of claim 1, the one or more programs of instructions executed by the computer further comprising a driver update module to update each driver installed on a terminal, wherein the driver update module checks for driver update pushed by the print server to the computer, and if the driver update has been pushed by the print server to the computer, the driver update module executes the driver update.

8. The non-transitory computer readable medium of claim 1, the one or more programs of instructions executed by the computer further comprising a driver update module to update each driver installed on a terminal, wherein when the user selects a particular installed printer, the driver update module checks for available update of the driver of the particular installed printer, and if driver update is available, the driver update module executes the available driver update.

9. A system of terminals connected to a network and that have a need for print service, plural printers also being connected to the network, the system comprising:

a print server that registers for each printer amongst the plural printers connected to the network, one or more installer packages for installing a driver of the printer; and a non-transitory computer readable medium embodying one or more programs of instructions executable by a computer, wherein the one or more programs of instructions executed by the computer comprises:

a printer selection interface to communicate with the print server to receive a listing of printers selectable by a user of the computer, display the listing of printers, receive user selection of a printer amongst the listing of printers, communicate with the print server to request a print driver for the user-selected printer, and receive an installer package from the print server; and a printer installation module that automatically creates, upon receipt of the installer package from the print server, an installation scenario file on the computer, the installation scenario file including plural executable actions executable by the computer without administrative login on the computer, the plural actions in the installation scenario file that are executable by the computer without administrative login on the computer including (a) an executable action to automatically execute the installer package on the computer to install the print driver corresponding to the user-selected printer, and in addition (b) an executable action to create a port on the computer, wherein said port created on the computer without administrative login permits, in response to the user selection of the printer amongst the listing of printers, access to the installed printer directly without communicating further with the print server.

10. The system of claim 9, wherein the print server communicates with the printer selection interface to determine a platform of the computer, and the print server determines, amongst the installer packages registered by the print server, suitable packages that can be executed on the platform of the computer, and the listing of printers communicated by the print server to the computer includes only printers for which the print server has registered at least one installer package that is suitable to be executed on the platform of the computer.

11. The system of claim 9, wherein the print server registers, for each terminal amongst the terminals in the system, the drivers installed on the terminal.

12. The system of claim 11, wherein when a new update of a driver is available, the print server determines update targets, amongst the terminals in the system, on which the driver is installed, and pushes the update to the update target.

13. The system of claim 9, wherein the one or more programs of instructions executed by the computer further comprises a driver update module to update each driver installed on a terminal, and for said each driver, the driver update module checks for available update of the driver, and if driver update is available, the driver update module executes the available driver update.

14. The system of claim 9, wherein the one or more programs of instructions executed by the computer further comprises a driver update module to update each driver installed on a terminal, and the driver update module checks for driver update pushed by the print server to the computer, and if the driver update has been pushed by the print server to the computer, the driver update module executes the driver update.

15. The system of claim 9, wherein the one or more programs of instructions executed by the computer further comprises a driver update module to update each driver installed on a terminal, and when the user selects a particular installed printer in the print application, the driver update module checks for available update of the driver of the particular installed printer, and if driver update is available, the driver update module executes the available driver update.

16. A method for automatically installing device drivers on a network-connected user terminal, said method comprising:

providing a printer selection interface that displays a listing of network-connected printers and receiving user selection of a specified printer selected from the listing of network-connected printers;

communicating with a print server to obtain a printer installer package for the user-selected printer, from the print server;

generating automatically on the user terminal, upon receipt of the printer installer package from the print server, an installation scenario file on the user terminal, the installation scenario file including plural executable actions executable by the computer without administrative login on the computer, the plural actions in the installation scenario file that are executable by the computer without administrative login on the computer including (a) an executable action to automatically execute the installer package on the terminal to install the print driver corresponding to the user-selected printer, and in addition (b) an executable action to create a port on the terminal, wherein said port created on the computer without administrative login permits, in response to the user selection of the printer amongst the listing of printers, access to the installed printer directly without communicating further with the print server.

17. The method of claim 16, wherein the listing of printers is displayed by the printer selection interface as printer icons corresponding to the respective printers in the listing.

18. The method of claim 16, wherein the plural actions in the installation scenario file includes an action to determine a network address of the installed printer and install a port monitor corresponding to the network address of the printer.

19. The method of claim 16, wherein the plural actions in the installation scenario file includes an action to determine a network address of the installed printer and install an agent directed to the network address of the printer.

20. The method of claim 16, wherein the installer package received from the print server is a signed package, and the method further comprises performing a signature verification of the signed installer package before executing the installer package.

\* \* \* \* \*